(12) United States Patent
Bacher et al.

(10) Patent No.: US 6,607,299 B1
(45) Date of Patent: Aug. 19, 2003

(54) APPARATUS FOR REMOVING DEBRIS FROM THERMOPLASTIC MATERIALS

(76) Inventors: Helmut Bacher, Bruck/Hausleitan 17, St. Florian (AT), A-4490; Georg Wendelin, Waldbothenweg 84, Linz (AT), A-4033; Helmuth Schulz, Badsstrasse 20, St. Florian (AT), A-4490

(*) Notice: Subject to any disclaimer, the term of this patent is extended or adjusted under 35 U.S.C. 154(b) by 0 days.

(21) Appl. No.: 09/913,242

(22) PCT Filed: Feb. 2, 2000

(86) PCT No.: PCT/AT00/00024
  § 371 (c)(1),
  (2), (4) Date: Aug. 9, 2001

(87) PCT Pub. No.: WO00/47394
  PCT Pub. Date: Aug. 17, 2000

(30) Foreign Application Priority Data

Feb. 9, 1999 (AT) .............................................. 174/99

(51) Int. Cl.$^7$ ............................. B29B 7/58; B29C 47/68
(52) U.S. Cl. .......................................... 366/87; 366/89
(58) Field of Search .............................. 366/77, 79, 81, 366/82, 87–90; 425/204, 208, 209

(56) References Cited

U.S. PATENT DOCUMENTS

| | | | | |
|---|---|---|---|---|
| 2,595,210 A | * | 4/1952 | Clinefelter | |
| 3,193,877 A | * | 7/1965 | Edwards | |
| 3,360,824 A | * | 1/1968 | Schippers | |
| 3,501,807 A | * | 3/1970 | Selbach | |
| 5,419,634 A | * | 5/1995 | Bacher et al. | |
| 5,651,944 A | * | 7/1997 | Schulz et al. | |
| 6,206,558 B1 | * | 3/2001 | Beckwith | |
| 6,406,174 B2 | * | 6/2002 | Bacher et al. | |

FOREIGN PATENT DOCUMENTS

| | | | |
|---|---|---|---|
| EP | 689918 | * | 1/1996 |
| EP | 705677 | * | 4/1996 |
| GB | 2027605 | * | 2/1980 |
| WO | 93/04841 | * | 3/1993 |

* cited by examiner

Primary Examiner—Charles E. Cooley
(74) Attorney, Agent, or Firm—Townsend and Townsend and Crew LLP

(57) ABSTRACT

An apparatus for filtering thermoplastic synthetic plastic material has a screw (5) bearingly supported within a housing (1) for rotation around its longitudinal axis for the transport and preferably also plasticizing of the synthethic plastic material. This material is supplied to the screw (5) through an intake opening (7) into the housing (1) and leaves the housing (1) through an exit opening (8). The screw (5) is subdivided into two sections (9, 10) disposed one behind the other in axial direction. A filter (40) provided with penetration openings (25) is disposed in the flow of the synthetic plastic material that is disposed between these two sections (9, 10), which filter (40) is disposed within the housing (1) between the two sections (9, 10) of the screw (5) so that it subdivides the interior of the housing. The filter (40) is connected for common rotation with at least one of the screw sections (9, 10). At least one scraper (26) mounted in the housing (1) engages the upstream side of the filter (40) and strips off coarse impurities from the filter when the filter (40) is rotated and conveys the impurities into a collecting space (27) that is in connection with the interior of the housing.

23 Claims, 2 Drawing Sheets

APPARATUS FOR REMOVING DEBRIS FROM THERMOPLASTIC MATERIALS

BACKGROUND OF THE INVENTION

The invention refers to an apparatus for filtering thermoplastic synthetic plastic material, having a screw bearingly supported within a housing for rotation around its longitudinal axis for the transport and preferably also plasticizing of the synthetic plastic material that is supplied to the screw into the housing through an intake opening and leaves the housing through an exit opening, for example a nozzle, wherein the screw is subdivided into two sections disposed one behind the other in axial direction and wherein a filter provided with penetration openings for the synthetic plastic material is disposed in that flow of the synthetic plastic material that is disposed between the two sections.

An apparatus of this kind has become known (EP 600,924 B). Within this known construction the two screw sections are separated from each other by a sealing section that is by-passed by the processed synthetic plastic material via a by-pass leading out of the housing. A filter is arranged in this by-pass by which impurities contained in the thermoplastic synthetic plastic material to be processed are retained. This known apparatus is well suited for fine-grained impurities if they do not constitute too high an impurity portion within the synthetic plastic material. If, however, the synthetic plastic material to be processed contains coarser impurity fractions, for example small stones or metal parts, such as bottle caps, paperclips, wire stitches or the like, the filter and the filter channels of the known apparatus become quickly blocked, so that the filter cannot accomplish its function.

SUMMARY OF THE INVENTION

The invention has as one of its objects to improve a construction of the initially described kind so that filtering of coarse impurities can be done reliably and at a low price without the filter being frequently changed. The invention solves this task by disposing the filter within the housing between the two screw sections so that it subdivides the interior of the housing and is connected for common rotation with at least one of the screw sections, and with a scraper carried by the housing engaging the upstream side of this filter, which scraper scrapes off coarse impurities from the filter when it is rotated and conveys these impurities into a collecting space in connection with the interior of the housing. This filter retains the coarse impurities so that the filter is passed only by the synthetic plastic material and fine impurities contained therein, if any. If the latter impurities are undesirable, a fine filter, for example of the initially described construction or disposed at the end of the screw, can follow.

By continuously scraping off the coarse impurities with the scraper, the upstream side of the inventive coarse filter is kept free from adsorption and deposits so that coarse impurities also do not block the penetration openings of the filter, but are compulsorily continuously conveyed off into the collecting space. When the volume of this collecting space is sufficiently dimensioned, the apparatus can operate for a long time without there being a danger of a breakdown because of blocking of the filter.

It is known within an extruder for synthetic plastic material (EP 689,918 A) to dispose a stationary fine filter within the housing between a supply screw and the extruder nozzle for the separation of impurities contained in synthetic plastic material, and to scrape off the impurities collecting on the upstream side of the fine filter by means of a scraper rotating together with the screw. For the filtering of coarse impurities, this apparatus is not useful.

According to a further embodiment of the invention, the filter is disposed at a member separate from the screw sections or constitutes such a member. This is advantageous when manufacturing and, if desired, enables one to change over already existing plants in the sense of the invention.

A particularly favorable construction consists within the spirit of the invention in that the filter is provided with a shaft section constituting the separate member, being disposed between the two screw sections and being provided with an annular flange having penetration openings, this shaft section being connected for common rotation on at least one of its front ends with the neighboring screw section. This results in a simple, easily exchangeable and reliable construction. Connection for common rotation can be made by a screw section, which has the advantage that this connection, if desired, can easily be detached at any time, but if the direction of rotation of the screw sections and of the thread direction of this screw connection are efficiently chosen, in operation the screw connection is automatically tightened so that an undesired detachment is not possible.

A particularly favorable construction consists within the spirit of the invention in that the shaft section at the upstream side of the filter has a lesser diameter than at the downstream side. Thereby, at the upstream side of the filter there is a space for the impurities scraped off by the scraper.

Further, advantages are obtained if the penetration openings of the filter have a cross-section that increases in the flow direction of the synthetic plastic material. This avoids solid bodies entering into a penetration opening can be crammed in the penetration opening, thereby blocking the filter.

Another suitable construction consists within the spirit of the invention in that the scraper is provided with a scraping edge engaging a cylindrical section of the filter, particularly a cylindrical section of the shaft section, which cylindrical section immediately neighbors the upstream side ends of the penetration openings. Thereby, the coarse impurities are compulsorily conveyed off in a continuous and reliable manner.

A preferred embodiment of the invention consists in that the housing has a central section surrounding the separate member and being detachably connected to its neighboring housing sections so that after dismounting this central housing section, the separate member carrying or constituting the filter can be put off the housing. Therefore, the filter or the member constituting or carrying it, respectively, constitutes an easily exchangeable member, which results in advantages when replacing or cleaning.

Within the invention, the scraper can be disposed within a tube connected laterally to the housing, in particular to its detachable central section, which tube with its interior constitutes at least a portion of the collecting space. This results in a low-cost construction because the members necessary for mounting the scraper at the same time serve for confining the collecting space. Within this, it is suitable to mount the scraper adjustably within the tube in a direction perpendicular to the axis of the screw, in order to enable one to adapt the position of the scraper to manufacturing tolerances and to wear occurring during operation. In order to enable one to easily exchange the scraper, when necessary, within the spirit of the invention the tube is detachably connected to the housing, in particular to its detachable central section. Further, it is suitable if the tube has a detachable closure cap, in particular a screw cap, at its end opposite the housing, because after detaching this closure cap the collecting space confined by the tube is accessible for emptying or cleaning. The collecting space can be provided with a closure valve so that a preferably automatic emptying of the collecting space is possible during operation.

DESCRIPTION OF THE PREFERRED EMBODIMENT

Figure 1:
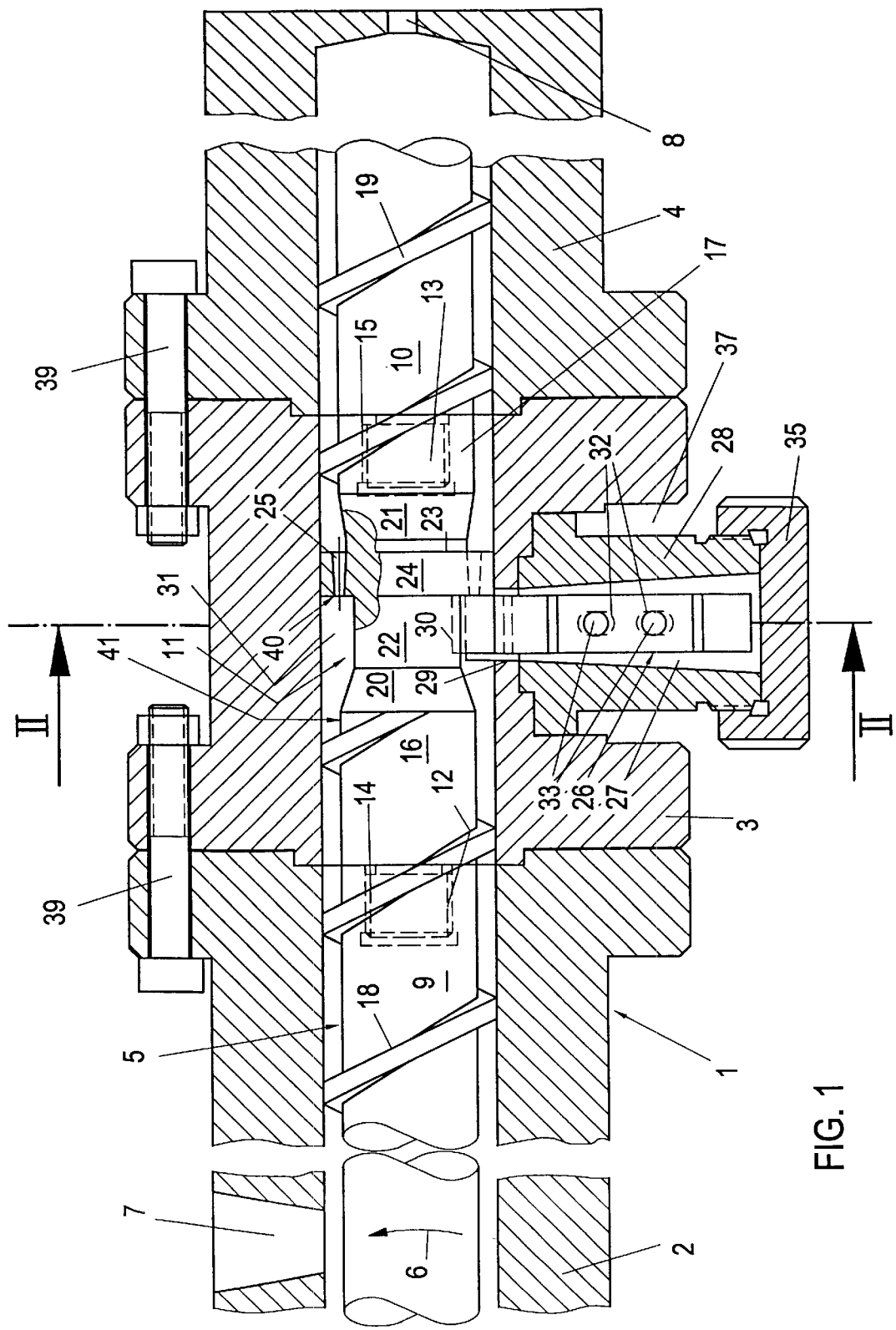
FIG. 1 shows an axial section through the inventive apparatus.

The apparatus for filtering thermoplastic synthetic plastic material has a housing 1 that comprises an intake section 2, a central section 3, coaxially disposed thereto, and an exit section 4, also coaxially disposed thereto. Within the housing 1, a screw 5 is bearingly supported for rotation around its longitudinal axis and is driven for rotation in direction of the arrow 6 by a drive means, not shown. The thermoplastic synthetic plastic material to be processed is supplied to the screw 5 through an intake opening 7 of the intake section 2 of the housing 1. The screw 5 conveys the synthetic plastic material within the housing 1 toward an exit opening 8 disposed in the exit section 4, which opening can be formed by an extruder nozzle. Preferably, the synthetic plastic material is also plasticised during this conveyance. The screw 5 has two sections 9, 10 disposed one behind the other in axial direction, the section 9 being disposed substantially within the intake section 2, and the section 10 substantially being disposed within the exit section 4. The two screw sections 9, 10 are connected to each other for common rotation via a separate member 11, and this by means of threaded trunnions 12 or 13 provided at this member 11 or at the screw section 10, respectively, which trunnions are screwed into corresponding threaded bores 14 or 15 of the screw section 9 or of this member 11, respectively. The direction of the threads of these screw sections is so chosen that, when the screw 5 is rotated in direction of the arrow 6, no loosening of these screw connections occurs, but a tightening of them.

The member 11 constitutes a shaft section 41 connected for common rotation to the screw sections 9, 10 and has two cylindrical sections 16, 17 adjoining the sections 9 or 10 of the screw 5, the diameters of the sections 16, 17 preferably being equal to each other and also equal to the core diameter of the screw sections 9 or 10. The volutions 18 or 19 of the screw sections 9 or 10 are continued on the sections 16, 17 of the member 11. The outer diameter of these volution continuations is equal to that of the volutions 18 or 19 of the screw 5, so that the inner diameter of the housing sections 2, 3 and 4 is always the same. At the transition locations of the volutions 18, 19 of the member sections 16, 17 to the screw sections 9 or 10, steps of the screw volutions may occur, they are not disturbing. Conical sections 20 or 21 adjoin the cylindrical sections 16 or 17 and merge into cylindrical sections 22 or 23, from which the section 22 has a greater length—measured in axial direction of the screw 5—than the section 23. The two sections 22, 23 are interconnected to each other by a flange 24 of the member 11, the outer diameter thereof being equal to the outer diameter of the screw sections 9, 10. The synthetic plastic material, if desired plasticised, can pass this flange 24 through penetration openings 25 disposed within it. The penetration openings 25 are disposed along at least one circle, preferably along a plurality of circles, around the axis of the screw 5. In the embodiment shown, only one of these circles of openings is shown, the inlet openings of the penetration openings 25 of this circle being disposed substantially centrally between the periphery of the section 22 and the inner wall of the housing section 3, when seen in radial direction of the member 11. The exit openings of the penetration openings 25 preferably have their periphery flush to the cylindrical section 23 of the member 11. Suitably, the penetration openings 25 have a circular cross section that enlarges in flow direction of the synthetic plastic material. The size of the cross section of the penetration openings 25 is so chosen that there results a filter 40 for coarse impurity particles of the processed synthetic plastic material, in particular for bigger solid particles, as stones, metal clips or the like. By the increasing cross section of the penetration openings 25 it is ensured that a solid particle that has entered a penetration opening 25 cannot be clogged within the penetration opening 25.

The solid particles retained by the flange 24 collect at the upstream side of the flange 24 and are taken along in the direction of the arrow 6 when the screw 5 rotates, since the sections 16, 20, 22, 24, 23, 21, 17 of the member 11 constitute a shaft section 41 rotating together with the screw 5. This enables one to compulsorily convey off these impurities continuously by means a scraper 26 from the interior of the housing 1 into a collecting space 27 in connection with the interior of the housing. This collecting space 27 is confined by a tube 28 screwed laterally (with respect to the axis of the screw 5) to the central section 3 of the housing 1 and in connection via an opening 29 in the wall of the housing section 3 with its interior. This opening 29 is intersected by the scraper 26 which at its end disposed within the housing section 3 is provided with two scraping edges 30 engaging the periphery of the cylindrical section 22 of the member 11 and the flange 24, so that the solid particles are continuously conveyed off also from this surface. As can be seen, when the screw 5 is rotated, the pointed end of the scraper 26 brushes over the penetration openings 25. Since this pointed scraper end is bent against the direction of rotation of the screw 5 (arrow 6, FIG. 2), a force component acts onto the solid particles scraped off which tends to compulsorily convey these particles out of the annular space 31 neighboring the penetration openings 25 towards the collection space 27. This is supported by the centrifugal force and by the pressure of following solid particles.

The scraper 26 is adjustably mounted in the tube 28 so that its position relative to the screw 5 and relative to the flange 24 can be adjusted, for example when assembling or for compensation of manufacturing tolerances or after re-sharpening of the pointed scraper end. For this, the scraper 26 has two elongated openings 32 (FIG. 2) which are penetrated by two screws 33 with sufficient play, which screws together with a clamping plate 34 clamp the scraper 26 to the wall of the tube 28.

Figure 2:
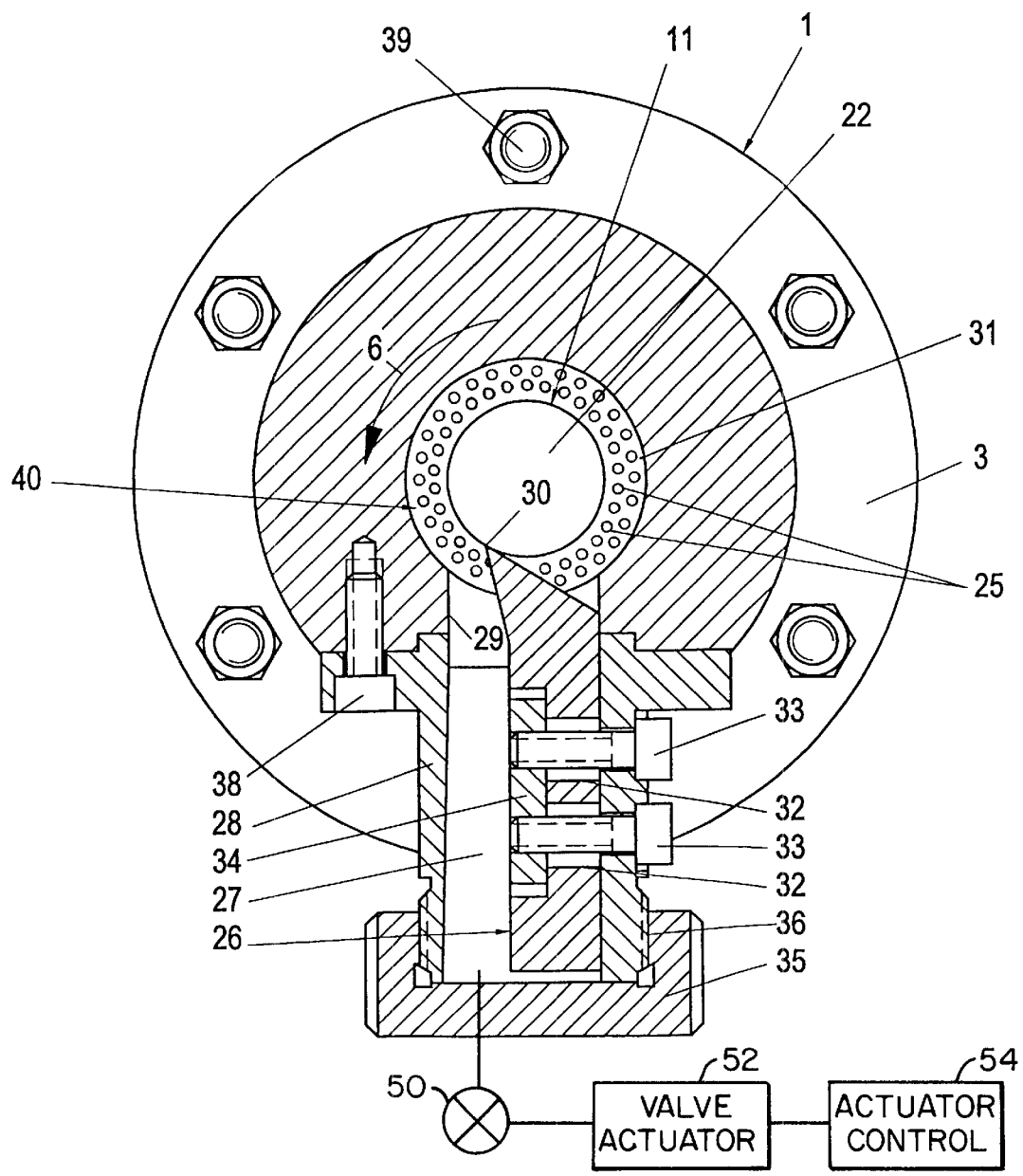
FIG. 2 is a section taken along the line II—II of FIG. 1 in a somewhat enlarged scale.

The tube 28 has on its end opposite the screw 5 a detachable closure cap 35 formed as a screw cap which is screwed onto screw threads 36 of the tube. This results in a tight closure which efficiently avoids pressure losses in the synthetic plastic material conveyed by the screw 5. After detaching the closure cap 35, the collecting space 27 is accessible from the outside, for example for inspection or cleaning. The tube 28 is inserted into a recess 37 (FIG. 1) of the central section 3 of the housing 1 and is screwed to the housing central section 3 by means of screws 38 (FIG. 2). If desired, a plurality of tubes 28 with scrapers 26 mounted therein may be provided, distributed around the axis of the housing 1.

Instead of the screw cap 35, each tube 28 may be provided with a valve 50 by which the collecting space 27 can be emptied. An actuator 52 under the control of an actuator control 54 can be provided for actuating the valve automatically, for example hydraulically or pneumatically or by means of electromotive forces, for example in dependence on time, so that the collecting space 27 can be emptied at predetermined time intervals. It is also possible to automatically empty the collecting space 27 in dependence on the pressure of impurity particles collected in the collecting space.

To facilitate mounting and enable one to easily exchange the member 11 constituting the coarse filter, the sections 2, 3, 4 of the housing 1 are detachably connected with each other by means of screws 39 (FIG. 1) engaging flanges of the housing elements.

If the coarse filter 40 is already sufficient, no further filter is necessary for cleaning the synthetic plastic material. However, it is further possible to place a finer filter in the flow of the synthetic plastic material following the coarse filter 40, when seen in the flow direction of the synthetic plastic material.

The exit opening 8 must not be an extruder nozzle. For example, if the screw 5 is no extruder screw but merely agglomerates the synthetic plastic material or merely conveys it, for example towards the inlet opening of a housing of a further screw, if desired, formed by an extruder screw, then the exit opening 8 can be constructed and disposed in any desired manner, for example also on the side wall of the exit section 4, therefore not axially directed as this is shown in FIG. 1. In particular, the latter construction will be given if the screw 5 is driven from the exit-side end, therefore, in contrast to the disposition according to FIG. 1, at which the (not shown) drive means of the screw 5 are disposed at the inlet-side end thereof.

What is claimed is:

1. Apparatus for removing impurities from thermoplastic synthetic plastic material, having a screw bearingly supported within a housing for rotation around its longitudinal axis for transporting the synthetic plastic material from an intake opening to an exit opening of the housing, the screw being subdivided into first and second screw sections axially disposed one behind the other, a filter for removing the impurities from the plastic material disposed inside the housing and between the first and second sections so that it subdivides an interior of the housing, the filter including penetration openings through which the synthetic plastic material passes and being connected for common rotation with at least one of the screw sections, and a scraper arranged in the housing positioned on an upstream side of the filter, the scraper being adapted to scrape off coarse impurities from the filter when the filter rotates and convey the impurities into a collecting space connected to the interior of the housing.

2. Apparatus according to claim 1, including a member separate from the screw sections and wherein the filter is disposed at the member.

3. Apparatus according to claim 2, wherein the member is separate from the screw sections and forms the filter.

4. Apparatus according to claim 2, wherein the member comprises a shaft section disposed between the first and second screw sections and forming the filter, and an annular flange including the penetration openings, at least one end of the shaft section being connected to an adjoining screw section for rotation therewith.

5. Apparatus according to claim 4, including a screw connection connecting the at least one end of the shaft section to the adjoining screw section.

6. Apparatus according to claim 4, wherein the shaft section upstream of the filter has a diameter that is less than a diameter of the shaft section downstream of the filter.

7. Apparatus according to claim 2, wherein the housing has a central section surrounding the separate member and is detachably connected to its neighboring housing sections so that after removal of the central housing section the separate member and the filter can be removed from the housing.

8. Apparatus according to claim 1, wherein a cross-section of the penetration openings increases in the flow direction of the synthetic plastic material.

9. Apparatus according to claim 1, wherein the scraper is provided with a scraping edge engaging a cylindrical section of the filter which is adjacent upstream ends of the penetration openings.

10. Apparatus according to claim 9, including a member comprising a shaft section disposed between the first and second screw sections and forming the filter, and wherein the cylindrical section is a section of the shaft section.

11. Apparatus according to claim 9, wherein the scraping edge is bent against a direction of rotation of the screw and defines a pointed end of the scraper.

12. Apparatus according to claim 1, including a tube connected laterally to the housing and forming at least a portion of the collecting space, and wherein at least a portion of the scraper is disposed within the tube.

13. Apparatus according to claim 12, wherein the housing includes a detachable central section and the scraper is connected to the detachable central section.

14. Apparatus according to claim 12, wherein the tube is detachably connected to the housing.

15. Apparatus according to claim 14, wherein the housing includes a detachable central section and the tube is connected to the detachable central section of the housing.

16. Apparatus according to claim 12, wherein an end of the tube opposite the housing is provided with a detachable closure cap.

17. Apparatus according to claim 16, wherein the cap is a screw cap.

18. Apparatus according to claim 12, including a valve associated with the tube for emptying the collecting space.

19. Apparatus according to claim 18, wherein the valve is one of a hydraulically, pneumatically and electromotively actuated valve.

20. Apparatus according to claim 19, including means for activating the valve at one of predetermined time intervals and a predetermined pressure of material in the collecting space.

21. Apparatus according to claim 1, wherein the penetration openings are arranged along at least one circle around the axis of the screw.

22. Apparatus according to claim 21, wherein the penetration openings are arranged along a plurality of circles arranged about the axis of the screw.

23. Apparatus for removing particulates from thermoplastic synthetic plastic material comprising a screw rotatably supported in a housing for transporting the synthetic plastic material from an intake opening to an exit opening of the housing, the screw including first and second screw sections axially disposed one behind the other, a filter for removing the particulates from the plastic material, disposed inside the housing and between the first and second sections, the filter including penetration openings extending substantially parallel to an axis of the screw sections, permitting passage of the synthetic plastic material and rotating with at least one of the screw sections, and a scraper positioned on an upstream side of the filter for removing the particulates from an upstream side of the filter as it rotates and conveying the particulates into a collecting space.

* * * * *